United States Patent [19]

Metzger et al.

[11] Patent Number: 5,242,617
[45] Date of Patent: Sep. 7, 1993

[54] LIQUID CRYSTAL PIGMENT, METHOD OF PRODUCING AND USE IN COATINGS

[75] Inventors: Carl W. Metzger, Denkendorf; Jürgen Münch, Sachsenheim, both of Fed. Rep. of Germany

[73] Assignee: Akzo N.V., Arnhem, Netherlands

[21] Appl. No.: 477,798

[22] Filed: Feb. 9, 1990

[30] Foreign Application Priority Data

Feb. 13, 1989 [EP] European Pat. Off. ...... 89200324.5

[51] Int. Cl.$^5$ .................. C09K 19/54; C09K 19/00; B05D 7/00
[52] U.S. Cl. ................. 252/299.5; 428/1; 428/913; 430/20; 427/212; 427/218
[58] Field of Search ........... 252/299.01, 299.5; 430/138, 203, 617, 20; 428/1, 913; 359/103; 427/212, 214, 218

[56] References Cited

U.S. PATENT DOCUMENTS

| | | | |
|---|---|---|---|
| 2,800,477 | 7/1957 | Green et al. | 252/316 |
| 3,341,466 | 9/1967 | Brynko et al. | 252/316 |
| 3,620,889 | 11/1971 | Baltzer | 161/5 |
| 4,010,307 | 3/1977 | Canard et al. | 428/327 |
| 4,301,054 | 11/1981 | Buirley et al. | 260/29.4 |
| 4,643,528 | 2/1987 | Bell | 350/334 |
| 4,745,151 | 5/1988 | Noll et al. | 524/591 |

FOREIGN PATENT DOCUMENTS

| | | |
|---|---|---|
| 0038127 | 10/1981 | European Pat. Off. . |
| 0228003 | 7/1987 | European Pat. Off. . |
| 0242731 | 10/1987 | European Pat. Off. . |
| 0287144 | 10/1988 | European Pat. Off. . |
| 0357844 | 3/1990 | European Pat. Off. . |
| 2201121 | 7/1973 | Fed. Rep. of Germany . |
| 2746228 | 4/1979 | Fed. Rep. of Germany . |
| 53-087986 | 2/1978 | Japan . |
| 54-80763 | 6/1979 | Japan . |
| 61-211395 | 9/1986 | Japan . |
| WO91/13125 | 9/1991 | PCT Int'l Appl. . |
| 2172606 | 9/1986 | United Kingdom . |

OTHER PUBLICATIONS

European Search Report.
H. Finkelmann and G. Rehage, "Investigation on Liquid Crystalline Polysiloxanes, 1-Synthesis and Characterization of Linear Polymers", Makromol. Chem., Rapid Commun., 1 (1980), pp. 31–34.
G. Rehage, "Flussigkristalline Polymers", Nach. Chem. Tech. Lab., 32, No. 4 (1984), pp. 287–295.
"Flussigkristalle", Ullmanns Enzyklopadie der Technischen Chemie (1976).
D. Makow, "Color Gamut of Liquid Crystal Polysiloxanes", Mol. Cryst. Liq. Cryst., 123 (1985), pp. 341–353.
British Drug House (BDH) sales literature (date unknown).
Kirk-Othmer's Third Edition, 1982, Third Edition, vol. 17, pp. 829–831. John Wiley & Sons.
Paul Nylen et al, *Modern Surface Coatings*, 1965, Sect. 13.45 (pp. 504–509) John Wiley & sons.

Primary Examiner—Robert L. Stoll
Assistant Examiner—Shean C. Wu
Attorney, Agent, or Firm—James K. Poole; Louis A. Morris

[57] ABSTRACT

The present invention relates to a liquid crystal pigment which allows the simpler use of liquid crystals in coating applications with greatly improved appearance uniformity of the liquid crystal effect. The liquid crystal pigment comprises a laminar particle which is at least partially coated with a liquid crystalline material, which has been precipitated from a solution onto the laminar particle.

22 Claims, No Drawings

LIQUID CRYSTAL PIGMENT, METHOD OF PRODUCING AND USE IN COATINGS

BACKGROUND OF THE INVENTION

The present invention relates generally to liquid crystals and their use in coating applications.

Liquid crystals include a large number of compositions which, in a liquid state, display properties typically observed in crystalline solids. The present invention is concerned primarily with liquid crystals displaying optical anisotropies, for example, those which undergo an appearance (e.g., color) change in response to an external stimulus such as a temperature change.

This particular class of liquid crystals is well-known to those skilled in the art and comprises, for example, various chiral nematic cholesterol and biphenyl derivatives. For further details about this type of liquid crystal, reference may be had to the following literature which is incorporated by reference herein for all purposes: H. Finkelmann and G. Rehage. "Investigation on Liquid Crystalline Polysiloxanes. 1 - Synthesis and Characterization of Linear Polymers." *Makromol. Chem., Rapid Commun.*, 1 (1980). pp. 31-34., G. Rehage. "Flüssigkristalline Polymers."*Nachr. Chem. Tech. Lab.*, 32. No. 4 (1984). pp. 287-95."Flüssigkristalle." *Ullmanns Encylklopadie der Technischen Chemie* (1976).

The use of these liquid crystals in coating applications is also generally known. See. e.g., D. Makow. "Color Gamut of Liquid Crystal Polysiloxanes." *Mol. Cryst. Liq. Cryst.*, 123 (1985). pp. 341-53. also incorporated by reference herein for all purposes.

A typical application method for such liquid crystals involves: (1) first dissolving a liquid crystalline material (liquid crystal and/or precursor thereof) in an appropriate solvent.. (2) next applying the resulting solution as a thin layer (typically less than 10 μm) onto a substrate: then (3) repeatedly and successively heating (often at temperatures of 80° C. or higher) and cooling the thin layer to orient and fix the liquid crystal. Steps (2) and (3) must be repeated until the desired total layer thickness. liquid crystal orientation and appearance uniformity have been achieved.

This process has several disadvantages. For one, it is much too involved and time consuming for most commercial applications. Further, the repetitive heating in step (3) can affect the stability of the liquid crystalline materials and, consequently, the properties of the resulting liquid crystal. Also, even by careful control it is difficult, at best, with the above method to obtain a liquid crystal coating with a uniform appearance and effect.

It is, therefore, an object of the present invention to provide a vehicle by which liquid crystals may be more easily applied and readily used in coating applications.

SUMMARY OF THE INVENTION

The aforementioned object is accomplished by utilizing, at least in part, a liquid crystal in the form of a pigment.

In its overall concept, the liquid crystal pigment is characterized in that it comprises a laminar particle at least partially coated with a liquid crystalline material. By "liquid crystalline material" is it meant a liquid crystal and/or a precursor thereof.

The present invention also provides coating composition comprising a liquid crystal, characterized in that the liquid crystal comprises, at least in part, the aforementioned liquid crystal pigment.

The liquid crystal pigment may be produced by the steps of: (a) dissolving a liquid crystalline material in a suitable solvent; (b) dispersing a laminar particle into the solvent; and (c) at least partially coating the laminar particle by precipitating at least a portion of the liquid crystalline material from the solution onto the laminar particle. The order of performing steps (a) and (b) should not be considered limiting.

The solution including the resulting liquid crystal pigment may then be applied directly as a coating layer onto a substrate or, as an alternative, the resulting liquid crystal pigment may be recovered from the solution and later dispersed in a suitable binder medium for application.

The liquid crystal pigments of the present invention, when so utilized, allow for the application of thicker coating layers with less effort to orient and fix the liquid crystals therein. Not only can this result in a less complicated application, but also can prevent significant degradation of the liquid crystalline materials due to the decreased exposure to potentially detrimental conditions such as high temperature. Further, the resulting liquid crystal coatings display a more uniform color appearance and effect, both of which are less sensitive to substrate irregularities.

These and other features and advantages of the present invention will be more readily understood by those skilled in the art from a reading of the following detailed description.

DETAILED DESCRIPTION OF THE PREFERRED EMBODIMENTS

As previously mentioned, in its overall concept the liquid crystal pigment of the present invention is characterized in that it comprises a laminar particle at least partially coated with a liquid crystalline material.

Laminar particles suitable for use with the present invention include a wide variety of organic and inorganic compounds utilizable in the coatings industry in laminar form, for example, as pigments and extenders. Such laminar particles are also often referred to by terminology such as flake, leaf and/or scale. Preferred laminar particles include, for example, graphite, aluminum flakes, iron-oxide coated aluminum flakes, laminar modifications of phthalocyanine pigments, coated and uncoated mica pigments, glass flakes, talcum, laminar carbon black, plastic flakes, laminar molybdenum disulfide and the like, particularly meeting the aforementioned characteristics. Particularly preferred among these are the graphite, molybdenum disulfide and phthalocyanine pigments. Combinations of laminar particles, of course, can also be utilized.

For use in coating applications in accordance with the present invention, these laminar particles can have wide ranging particle sizes, but preferably those of pigments utilized in the coatings industry. In preferred embodiments, the average particle diameters of the laminar particles generally range from about 5 μm to about 500 μm. more preferably from 10 μm to 150 μm. and most preferably from 20 μm to 50 μm. The particularly chosen laminar particle should, of course, also be compatible with the particular liquid crystalline material and other components of the coating system, which information is well-known or readily available to one skilled in the art.

Suitable liquid crystals for use with the present invention, as indicated earlier, include a wide variety of compounds which display an appearance change in response to an external stimulus. Preferred are those liquid crystals which undergo a color change in response to an external stimulus such as, for example, a temperature change.

Most preferred of these liquid crystals are those formed from compounds containing a polymeric (e.g., polysiloxane or polyacrylic) backbone with suitable mesogenic sidechains like, for example, various cholesterol and biphenyl derivatives. Additionally included are those liquid crystals produced from the polymerization of monomer precursors containing, for example, a (meth)acryolyl end group. Such liquid crystals and precursors are well-known in the art as exemplified by the literature previously incorporated by reference, and reference may be had to such literature for further details.

The liquid crystal pigment in accordance with the present invention is produced by coating at least a portion of the laminar particle with a suitable liquid crystalline material. As mentioned before, by "liquid crystalline material" is it meant a liquid crystal and/or precursor thereof.

This coating procedure is preferably accomplished by the steps of:
 (a) dissolving a liquid crystalline material in a suitable solvent:
 (b) dispersing a laminar particle in the solvent; and
 (c) at least partially coating the laminar particle by precipitating at least a portion of the liquid crystalline material from the solution onto the laminar particle.

For the above method, the order of performing steps (a) and (b) should not be considered limiting.

Suitable solvents in which to dissolve the liquid crystalline material depend, of course, on the particular liquid crystalline material chosen. Such solvent should, of course, also be compatible with the other components of the coating system. This information is well-known and readily available to one skilled in the art who, based upon these factors, can easily choose a suitable solvent for the desired coating system.

For step (a), the resulting liquid crystal solution should comprise a sufficient concentration of liquid crystalline material so that, when the liquid crystalline material is subsequently precipitated, an effective coating can be deposited onto the laminar particle. The liquid crystal solution, therefore, can be prepared to include widely varying liquid crystalline material concentrations. It is preferred that the solution should comprise a liquid crystalline material concentration of from 5 wt% to 50 wt%, more preferably from 10 wt% to 40 wt%, based upon the weight of the liquid crystal solution, Of course, the higher concentrations may in some instances require steps to be taken to increase the solubility of the liquid crystalline material, such as heating of the solvent or use of particular combinations of solvents.

For step (b), the laminar particle may be added to the solvent and dispersed therein in any well-known manner such as, for example, by stirring. Again, the laminar particle may be added in widely varying amounts, but it is preferred that the should be added in amounts ranging from 0.01 wt% to 20 wt%. more preferably from 0.1 wt% to 10 wt%. based upon the weight of the liquid crystal solution.

Once steps (a) and (b) are accomplished, and the laminar particle is well-dispersed within the solution, at least a portion of the liquid crystalline material is caused to precipitate from the solution onto the laminar particle. This may be accomplished in any number of well-known manners. e.g., by cooling the liquid crystal solution, removing solvent therefrom or adding a second solvent which is not a solvent for the liquid crystal precursor. Additionally, if the liquid crystal is formed from polymerizable monomer precursors, the polymerization may take place as this step.

The resulting liquid crystal solution, with the liquid crystal pigment dispersed therein, may then be applied directly onto a substrate in any manner commonly utilized in the coatings industry, such as by roller coating, spraying, brushing, sprinkling, flow coating, dipping. etc. Suitable substrates may be made, for example, of wood, metal and synthetic materials.

As an alternative means of utilizing the liquid crystal pigment, it can be recovered from the liquid crystal solution for later use, for example, dispersed in a suitable binder in the fashion of a normal pigment. Recovery of the liquid crystal pigment may be accomplished in any well-known fashion, such as by filtration, decantation. centrifugation, etc.

As suitable binders for the recovered liquid crystal pigment may be mentioned, for example, those described in EP-A-38127, EP-A-228003. EP-A-242731. EP-A-287144 and European Patent Application No. 88201966.4 (U.S. Pat. No. 5,194,183), all of which are incorporated by reference herein for all purposes. These and any number of other binders utilizable in the coatings industry will be suitable for use with the liquid crystal pigments of the present invention as long as the components of the binder and ultimate coating composition are compatible with those of the liquid crystal pigment, which information is well-known or readily available to those skilled in the art.

Minor amounts of other additives normally employed in the coatings industry such as, for example, solvents, other pigments, fillers. Levelling agents, foam suppressing agents, rheology control agents. antioxidants and UV stabilizers, may also be used in the coating compositions of the present invention as long as these other additives are compatible therewith.

It is especially preferred that the liquid crystal coating compositions of the present invention be applied over a substrate which is dark or darkened, preferably black, to obtain the maximum visual effect from the liquid crystals. The substrate may be darkened, for example, by the application of a suitable dark colored primer to the surface of the substrate.

Because of the presence of the liquid crystal pigments, the aforementioned coating compositions can be applied in a wide range of layer thicknesses generally up to about 50 $\mu$m, more preferably between about 1 um to about 25 $\mu$m, depending upon the desired effect. The so applied layers may be fixed and oriented by simple drying for short periods of time often at only slightly elevated temperatures, e.g., drying for five minutes at 60° C. of course depending again upon the components of the coating composition and the desired effect.

After application, the liquid crystal coating layer should be protected by the application of a topcoat, preferably a clear topcoat containing a UV absorber, which may be applied and cured in a normal manner. Examples of suitable topcoats are mentioned in the previously incorporated European Patent Application 88201966.4. and any number of other topcoats normally utilized in the coatings industry will also be suitable as long as the components of the topcoat are compatible with the other components of the coating system.

The foregoing more general discussion of the invention will be further exemplified by the following specific examples offered by way of illustration and not limitation of the above-described invention.

EXAMPLE 1

Typical Application Method

A 25 wt% solution of a liquid crystal precursor was prepared by adding "LC-Grün" a compound containing mesogenic side-chains attached to a polysiloxane backbone (commercially available from Consortium für Elektrochemische Industrie Gmbh), to diethyleneglycol dimethyl ether and stirring the mixture while heating to 100° C. until the liquid crystal precursor dissolved.

After cooling the liquid crystal precursor solution to room temperature under continuous stirring, it was applied to a Bonder 132 steel panel by spraying to a layer thickness of about 10 μm. The steel panel had been precoated with a black primer (Primer Black 03-59622. commercially available from Akzo Coatings Gmbh).

Following a pre-dry of 10 minutes at 60° C, a second layer of about 10 μm was applied by spraying and the system again pre-dried for 10 minutes at 60° C. In order to orient the liquid crystal, the system was additionally dried at 150° C. for 25 minutes.

As a final protective layer, a 2-component solvent-based clearcoat (Autocryl MS. commercially available from Akzo Coatings Gmbh) was applied by spraying to a layer thickness of about 40 μm and dried at 60° C. for 30 minutes.

The resulting coated panel, although exhibiting a typical green/yellow liquid crystal color effect when viewed in direct sunlight, was very poor in appearance with an extremely uneven distribution of liquid crystal color effect dependent heavily on minor surface irregularities of the substrate.

EXAMPLE 2

Example 1 was repeated except that, before the liquid crystal precursor solution was allowed to cool, 0.1 wt% of a graphite pigment (Graphitan 6154. commercially available from Ciba-Geigy AG) was added.

After cooling the liquid crystal precursor solution (with liquid crystal pigment) to room temperature under continuous stirring. it was applied in Example 1 to a layer thickness of about 25 μm and pre-dried for 10 minutes at 60° C. In order to further orient the liquid crystals, the layer was subsequently dried for 25 minutes at 150° C. As a final protective layer, a clearcoat was applied as in Example 1.

The resulting coated panel, when viewed as in Example 1. displayed a fine metallic effect and an evenly distributed liquid crystal color effect, with a color ranging from red-brown to green-brown depending upon angle of illumination.

EXAMPLE 3

Example 2 was repeated except that 0.5 wt% of a 65% solids content aluminum pigment (Stapa Metallux 212. commercially available from Eckart-Werke) was used in place of the graphite pigment.

The resulting coated panel, when viewed as in Example 1. again showed a metallic effect with an evenly distributed liquid crystal color effect. The color of the panel exhibited the typical metallic dark/light flop effect which was combined with color changes of light green to dark red depending upon the angle of illumination.

EXAMPLE 4

Example 2 was repeated except that 0.1 wt% of a silicate pigment (Naintsch Decor Pigment "Silber 250μm-500μm". commercially available from Naintsch Mineralwerke) was used in place of the graphite.

The resulting coated panel, when viewed as in Example 1. displayed a coarse glitter effect colored red and green, which was uniformly distributed over a dark blue-green/green-red background depending on the angle of illumination.

EXAMPLE 5

Example 2 was repeated except that 0.05 wt% of a laminar-form copper phthalocyanine pigment (Paliochrom Blue Gold FA 4071. commercially available from BASF AG) was used in place of the graphite.

The resulting coated panel, when viewed as in Example 1. displayed an evenly distributed deep red-blue color with a red-green flop effect. Variation of the angle of illumination showed an extreme angular dependence of color shade varying between bright blue and bright green.

EXAMPLE 6

Forty milliliters of a 25 wt% solution of liquid crystal precursor was prepared as in Example To the hot solution was added 0.04 g molybdenum disulfide (commercially available as Article No. 12257 from E. Merck). and the mixture was allowed to cool to room temperature under continuous stirring. The cooled suspension was subsequently filtered through a glass filter funnel with "Weissband" filter paper (commercially available from Sleicher und Schüll Gmbh), the resulting material washed with 2×50 ml tetrahydrofuran and finally dried at 60° C. for 2.5 hours.

The so-treated molybdenum disulphide was dispersed in diethyleneglycol dimethyl ether to a concentration of 0.1 wt%. and applied to a steel panel as in Example 1. A final clearcoat layer was also applied as in Example 1.

The resulting coated panel, when viewed as in Example 1, displayed a uniformly distributed solid color varying from green-brown to redblack depending upon angle of illumination.

The results demonstrate that, in addition to providing known pigments with new optical effects, the liquid crystal pigments of the present invention permit the use of liquid crystals in coating applications in a simpler fashion while overcoming the previously experienced nonuniformity in liquid crystal effect in appearance.

Many modifications and variations besides the embodiments specifically mentioned may be made in the compositions and methods described herein without substantially departing from the concept of the present invention. Accordingly, it should be clearly understood that the specific forms of the invention described herein are exemplary only. and are not intended as a limitation on the scope thereof.

We claim:

1. A liquid crystal pigment comprising laminar particles at least partially coated with at least one liquid crystal compound and/or precursor thereof wherein said laminar particles have an average particle diameter of from about 5 μm to about 500 μm.

2. The liquid crystal pigment according to claim 1, wherein the laminar particles comprise a laminar pigment.

3. The liquid crystal pigment according to claim 1, wherein the liquid crystal displays an appearance change in response to an external stimulus.

4. The liquid crystal pigment according to claim 3, wherein the liquid crystal displays a color change in response to an external stimulus.

5. A method for producing a liquid crystal pigment, comprising the steps of:
dissolving a liquid crystalline material in a suitable solvent to produce a liquid crystal solution:
dispersing laminar particle into the liquid crystal solution. and
precipitating at least a portion of the liquid crystalline material from the liquid crystal solution onto the laminar particles.

6. The method according to claim 5, comprising the further step of recovering the resulting liquid crystal pigment form the liquid crystal solution.

7. The method according to claim 5, wherein the laminar particles comprise a laminar pigment.

8. The method according to claim 5, wherein the laminar particles have an average particles diameter of from about 5 μm to about 500 μm.

9. The method according to claim 5, wherein the liquid crystal displays an appearance change in response to an external stimulus.

10. The method according to claim 9, wherein the liquid crystal displays a color change in response to an external stimulus.

11. A coating composition comprising a binder material and a liquid crystal pigment comprising laminar particles at least partially coated with at least one liquid crystal compound an/or precursor thereof wherein said laminar particles have an average particle diameter of from about 5 μm to about 500 μm.

12. The coating composition according to claim 11, wherein the laminar particles comprise a laminar pigment.

13. The coating composition according to claim 11, wherein the liquid crystal displays an appearance change in response to an external stimulus.

14. The coating composition according to claim 13, wherein the liquid crystal displays a color change in response to an external stimulus.

15. The liquid crystal pigment according to claim 4 wherein said stimulus is the angle of illumination.

16. The method according to claim 10 wherein said stimulus is the angle of illumination.

17. A method of applying to a substrate a coating composition comprising a liquid crystal pigment comprising laminar particles at least partially coated with a liquid crystal compound an/or precursor thereof wherein said laminar particles have an average particle diameter of from about 5 μm to about 500 μm.

18. The method of claim 17 wherein said coating composition further comprises a binder.

19. The method of claim 17 wherein the resulting coating displays an appearance change in response to an external stimulus.

20. The method of claim 17 wherein the resulting coating is protected by a topcoat.

21. A liquid crystal pigment prepared in accordance with the method of claim 5.

22. A coating composition comprising a binder material and a liquid crystal pigment prepared in accordance with the method of claim 5.

* * * * *

UNITED STATES PATENT AND TRADEMARK OFFICE
CERTIFICATE OF CORRECTION

PATENT NO. : 5,242,617
DATED : September 7, 1993
INVENTOR(S) : METZGER, Carl W. et al.

It is certified that error appears in the above—identified patent and that said Letters Patent is hereby corrected as shown below:

Column 7, line 16 of patent, "particle", should read -- particles --;

Column 7, line 23 of patent, "form", should read -- from --;

Column 7, line 27 of patent, "particles", should read -- particle --;

Column 8, line 2, claim 11 of patent, "an/or", should read -- and/or --;

Column 8, line 21, claim 17 of patent, "an/or", should read -- and/or --.

Signed and Sealed this

Twelfth Day of July, 1994

BRUCE LEHMAN

Attest:

*Attesting Officer*    *Commissioner of Patents and Trademarks*